(12) United States Patent
Petre

(10) Patent No.: US 6,615,472 B2
(45) Date of Patent: Sep. 9, 2003

(54) QUICK CHANGE BLOW MOLD SHELL ASSEMBLY

(75) Inventor: Patrick Petre, Caubille sur Mer (FR)

(73) Assignee: Sidel, Inc., Norcross, GA (US)

( * ) Notice: Subject to any disclaimer, the term of this patent is extended or adjusted under 35 U.S.C. 154(b) by 0 days.

(21) Appl. No.: 09/908,499

(22) Filed: Jul. 17, 2001

(65) Prior Publication Data

US 2002/0076463 A1 Jun. 20, 2002

Related U.S. Application Data

(63) Continuation of application No. 09/245,558, filed on Feb. 5, 1999.

(51) Int. Cl.$^7$ ................................................ B29C 49/48
(52) U.S. Cl. .................. 29/426.1; 29/464; 29/525.11; 425/195; 425/522
(58) Field of Search ............................ 249/79, 80, 102, 249/165, 168; 425/182, 183, 195, 522, 529, 541; 29/426.1, 525.11, 964

(56) References Cited

U.S. PATENT DOCUMENTS

| 417,176 A | 12/1889 | Haines |
| 467,881 A | 1/1892 | Fisher |
| 1,409,591 A | 3/1922 | Schavoir |

(List continued on next page.)

FOREIGN PATENT DOCUMENTS

| DE | 1916129 | 10/1969 |
| DE | 2307727 | 8/1973 |
| DE | 2545130 A1 | 4/1977 |
| DE | 2545131 A1 | 4/1977 |
| DE | 2545132 A1 | 4/1977 |
| DE | 2545134 A1 | 4/1977 |
| DE | 3613543 C1 | 12/1986 |
| DE | 3934495 C1 | 12/1990 |
| EP | 565917 A1 | 10/1993 |
| FR | 2057196 | 5/1971 |
| FR | 2613979 A1 | 10/1988 |
| FR | 2646802 A1 | 11/1990 |
| FR | 2653058 A1 | 4/1991 |
| FR | 2659265 A1 | 9/1991 |
| GB | 1230090 | 4/1971 |
| GB | 1425638 | 2/1976 |
| GB | 1577034 | 10/1980 |
| GB | 2240300 A | 7/1991 |
| JP | 58-36418 A | 3/1983 |
| JP | 60-011 316 A | 1/1985 |
| JP | 63-227 315 A | 9/1988 |
| JP | 1-60725 U | 4/1989 |
| JP | 2-82 436 U | 6/1990 |
| JP | 5-169522 A | 7/1993 |
| WO | WO 94/03320 A1 | 2/1994 |

OTHER PUBLICATIONS

"Quick–Change Systems Add to Blow Molders' Market Reach," by Patrick A. Toensmeier, Modern Plastics International, Aug. 1991 (pp. 30–31).
Patent Abstracts of Japan, vol. 12, No. 286 (M–727), Aug. 5, 1988 (Abstract of Japanese Reference 63–062,710, dated Mar. 19, 1988).

*Primary Examiner*—Robert Davis
(74) *Attorney, Agent, or Firm*—Alston & Bird LLP

(57) ABSTRACT

A quick change blow mold shell assembly is disclosed. The blow mold shell assembly includes a carrier plate and a blow mold half shell for being fastened to the carrier plate. A first slotted opening is defined in an edge of the carrier plate, and a corresponding second slotted opening is defined in an edge of the blow mold half shell. The first and second openings are placed in registry with one another as the shell is positioned on its carrier plate. A fastener clip is also provided, the clip being sized and shaped to be received in each one of the respective openings, and being constructed and arranged to align the first and second openings with respect to one another, to draw the shell snuggly against the carrier plate, and to fasten the shell to its carrier plate as a fastener is passed through the clip and into the carrier plate.

13 Claims, 4 Drawing Sheets

U.S. PATENT DOCUMENTS

| | | | |
|---|---|---|---|
| 2,790,994 A | 5/1957 | Cardot | |
| 2,959,812 A | 11/1960 | Allen | |
| 3,191,225 A | 6/1965 | Polka | |
| 3,380,121 A | 4/1968 | Chittenden et al. | |
| 3,601,858 A | 8/1971 | Blanchard | |
| 3,632,249 A | 1/1972 | Pearson | |
| 3,651,186 A | 3/1972 | Hall | |
| 3,753,641 A | 8/1973 | Turner et al. | |
| 3,768,948 A | 10/1973 | Horberg, Jr. et al. | |
| 3,784,344 A | 1/1974 | Korsch | |
| 3,802,823 A | 4/1974 | Doughty et al. | |
| 3,807,928 A | 4/1974 | Horberg, Jr. et al. | |
| 3,843,286 A | 10/1974 | Horberg, Jr. et al. | |
| 3,854,855 A | 12/1974 | Pollock et al. | |
| 3,857,660 A | 12/1974 | Flynn et al. | |
| 3,871,611 A | 3/1975 | Taketa | |
| 3,993,427 A | 11/1976 | Kauffman et al. | |
| 4,009,979 A | 3/1977 | Martin | |
| 4,035,463 A | 7/1977 | Rosenkranz et al. | |
| 4,046,498 A | 9/1977 | Appel et al. | |
| 4,072,456 A | 2/1978 | Appel et al. | |
| 4,092,097 A | 5/1978 | Appel et al. | |
| 4,117,050 A | 9/1978 | Appel et al. | |
| 4,120,636 A | 10/1978 | Appel et al. | |
| 4,151,976 A | 5/1979 | Schurman | |
| 4,213,750 A | 7/1980 | Kubota et al. | |
| 4,233,022 A | 11/1980 | Brady et al. | |
| 4,268,242 A | 5/1981 | Natter | |
| 4,318,882 A | 3/1982 | Agrawal et al. | |
| 4,357,288 A | 11/1982 | Oas et al. | |
| 4,472,128 A | 9/1984 | Ruhl | |
| 4,500,275 A | 2/1985 | Ruhl | |
| 4,568,263 A | 2/1986 | Ruhl | |
| 4,701,121 A | 10/1987 | Jakobsen et al. | |
| 4,702,456 A | 10/1987 | Von Holdt | |
| 4,714,421 A | 12/1987 | D'Agostino | |
| 4,822,543 A | 4/1989 | Iizuka et al. | |
| 4,861,542 A | 8/1989 | Oles et al. | |
| 5,096,404 A | 3/1992 | Janos et al. | |
| 5,116,450 A | 5/1992 | Spoo et al. | |
| 5,255,889 A | 10/1993 | Collette et al. | |
| 5,262,116 A | 11/1993 | Von Holdt, Sr. | |
| 5,284,432 A | 2/1994 | Wurzer | |
| 5,288,222 A | 2/1994 | Wieser | |
| 5,295,804 A | 3/1994 | Dinnan | |
| 5,326,250 A | 7/1994 | Doudement | |
| 5,332,384 A | 7/1994 | Abramat | |
| 5,346,386 A | 9/1994 | Albrecht et al. | |
| 5,350,289 A | 9/1994 | Martin | |
| 5,358,396 A | 10/1994 | Antonius Giesen | |
| 5,411,698 A | 5/1995 | Mero et al. | |
| 5,439,368 A | 8/1995 | Martin | |
| 5,458,825 A | 10/1995 | Grolman et al. | |
| 5,551,860 A | 9/1996 | Budzynski et al. | |
| 5,551,861 A | 9/1996 | Baldi | |
| 5,556,648 A | 9/1996 | Budzynski et al. | |
| 5,683,729 A | 11/1997 | Valles | |
| 5,750,161 A | 5/1998 | Schock, Jr. et al. | |
| 5,968,560 A | 10/1999 | Briere et al. | |
| 6,113,377 A | 9/2000 | Clark | |

QUICK CHANGE BLOW MOLD SHELL ASSEMBLY

CROSS-REFERENCE TO RELATED APPLICATIONS

This application is a continuation of the co-pending U.S. patent application Ser. No. 09/245,558, filed on Feb. 5, 1999, which is hereby incorporated herein in its entirety by reference.

FIELD OF THE INVENTION

This invention relates in general to blow mold machinery, and to the blow molding of containers. More particularly, this invention relates to an improved blow mold shell assembly having a blow mold shell and carrier plate in which the blow mold shell is adapted to be changed out for use in a quick and expedient fashion, while also aligning and fastening the blow mold shell to its carrier plate.

BACKGROUND OF THE INVENTION

A large number of beverages, to include a wide variety of food products, are packaged in plastic bottles and/or containers. Plastic has proven to be a useful material as it can be readily adapted and formed into a variety of shapes and sizes, as well as designs. Moreover, a variety of plastics can be used to form bottles to package beverages, for example, as well as containers for semi-solid food products to include mayonnaise and peanut butter. Such plastics include polyethylene, polyvinylchloride, and polyethylene terephthalate, also known as "PET" to those skilled in the industry.

The use of PET has grown due to the ease with which the material can be formed through a blow molding operation, either injection blow molding, stretch blow molding, or extrusion blow molding. Moreover, PET has the benefit of being lightweight, transparent, and has a superior resistance to impact, heat and pressure and lastly, it is 100% recyclable.

The shape, size and/or design of the molded PET container is a result of the design machined into a blow mold shell assembly. The shell assembly will typically include two opposed mold shell halves, each of which is machined, typically, from a ductile and durable metallic material, such as steel, to include stainless steel, and more recently aluminum. Aluminum offers the advantage of being lighter in weight, and easier to machine, although it can be more easily damaged. Once the mold shell halves are fabricated, they are then each affixed to a separate one of a pair of opposed support plates, also known as carrier plates or shell holders, which are themselves affixed to the blow mold machine, and more particularly to a shell opening and closing device.

In the blow mold process, a heated PET preform is positioned between the mold shell halves, whereupon the mold shell halves are then closed about the preform by the shell opening and closing device, at which point in time the preform is stretched, and compressed air or other suitable gases are passed into the preform such that it expands and takes on the shape of the mold cavity, and thus the container defined by the mold shell halves and an adjoining base portion of the mold which is moved into position as the shell halves close about the preform.

The known types of blow mold machines used for the process include linear or straight line blow mold machines which move the blow mold shells along a straight line toward and away from one another, as disclosed in U.S. Pat. No. 5,284,432 to Wurzer, and U.S. Pat. No. 5,551,861 to Baldi. The newer generation of blow molding machines are rotary blow mold machines, such as those shown in U.S. Pat. No. 3,854,855 to Pollock, et al.; U.S. Pat. No. 4,861,542 to Oles, et al.; U.S. Pat. Nos. 5,551,860 and 5,556,648, both to Budzynski, et al.; and U.S. Pat. No. 5,683,729 to Valles, which patent is assigned to Sidel S.A., the parent company of the assignee of this application.

In order to make a variety of containers in differing shapes, sizes and/or designs, it is necessary to "cut" molds for each such specific shape, size, and/or design. In order to produce a variety of shapes, sizes and designs among these blow mold containers, therefore, a container manufacturer or food packager can either have a machine dedicated to producing a certain type of container, or will be required to remove and replace differing blow mold shell sets; i.e., matching blow mold shell halves and the base assembly, from the blow mold machine when changing over from producing containers of a first size to a second size, for example. In a straight line blow mold machine such as that disclosed in the '861 patent to Baldi or the '432 patent to Wurzer, this is relatively easy to accomplish in that there typically is an adequate amount of room for a machine service technician to gain access to the molds, remove them from their carrier plates, and then install the new shell halves. However, on rotary blow mold machines, this becomes more of a problem.

U.S. Pat. No. 5,326,250 to Doudement, also assigned to the parent concern of the assignee of this invention, discloses an opening and closing mechanism for use in opening and closing a blow mold half shells on a rotary blow mold machine. As shown in Doudement, the mechanism is configured as a clam shell arrangement having a fixed pivot about which the mold shell halves will be pivoted for opening and closing. The carrier plates of the shell assembly will be affixed to the opening and closing mechanism, and in turn the blow mold shell halves will be removed from and replaced on their respective carrier plates based on the size, shape, or design of the container being produced.

The problem faced, however, by machine service technicians is that as this is a clam shell type of opening and closing mechanism, there is a limited amount of space available for gaining access to any threaded fasteners, or other fasteners which may be used for securing the blow mold shell halves to the holder or carrier plates. The changing over of the blow mold shell halves thus becomes a laborious and tedious process, made all the more difficult by the close confines within which these machines are typically housed. Thus, there is a need for an improved blow mold shell assembly in which the blow mold shells can be quickly and easily installed, removed, and replaced, as needed, to improve production efficiency and reduce the amount of machine downtime incurred when changing over the blow mold shell sets.

Another problem faced when changing over blow mold shell sets, more so on a clam shell type of holder arrangement on a rotary blow mold machine than with a straight line machine, is the alignment of the shell halves with their respective carrier plates. As known to those of skill in the art, a cooling or heat-treating fluid is oftentimes passed through conduits or channels defined in the carrier plate, the carrier plate in turn having ports which will be positioned in registry with inlet and discharge ports, respectively, defined in the blow mold shell halves. The precise alignment of the shell halves on the carrier plates is thus necessary in order to ensure that the cooling or heat-treating fluid does not leak out over the molds during the blow mold process, leading to undesirable or unacceptable containers, all of which tends to decrease machine efficiency. What is needed, therefore, is an improved blow mold shell assembly in which not only can the blow mold shells be quickly and easily removed and replaced, but which will also precisely align the blow mold shell with its respective carrier plate during the changeover process.

An additional problem faced by blow mold container manufacturers deals with the use of the newer generation of mold shell materials, for example aluminum. A great many blow mold shell halves are threadably affixed to their carrier plates by passing a threaded fastener through the carrier plate and into the mold shell, or by using clamps or straps which are threadably passed into both the carrier plate and the mold shell halve. The problem faced with using softer metals, for example aluminum, is that a machine service technician may over tighten a fastener such that the threads within the shell become stripped or destroyed, necessitating that the shell be removed from use and retapped, if possible, as the shell will no longer be securely fixed to its carrier plate, nor will it remain in a fixed position on its carrier plate during the high operating speeds employed by rotary blow mold machines. Moreover, due to the cost of machining blow mold shell halves, it is desirable that the service life of the shell half be extended for as long a time period as possible. What is needed, therefore, is an improved quick change blow mold shell assembly which will quickly and easily secure a blow mold shell half to its respective carrier plate without requiring the use of threaded fasteners passed into the blow mold shell.

SUMMARY OF THE INVENTION

The present invention provides an improved quick change blow mold shell assembly which overcomes some of the design deficiencies of the known blow mold shell assemblies. This invention provides a simple, efficient, and cost effective quick change blow mold shell assembly for use on the known types of blow mold machinery, and with which blow mold shell halves can be quickly, easily, and accurately changed out when it is desired to change the blow mold shells during a product size or design changeover, especially on rotary blow mold machines.

The improved quick change blow mold shell assembly of this invention thus includes a carrier plate adapted for being fastened to a blow mold shell assembly opening and closing device of the type known in the art. A first opening is defined in an edge of the carrier plate. The invention also includes a blow mold shell, or more preferably a half shell, having a second opening defined in an edge thereof. The first and second openings of the carrier plate and the half shell, respectively, are placed in registry with one another as the shell is positioned on its carrier plate for being mounted to a blow mold machine. A fastener clip sized and shaped to be received in each one of the respective openings defined in the carrier plate and the half shell, respectively, is provided. The fastener clip is constructed and arranged to align the first and second openings with respect to one another, thus aligning the shell with its carrier plate, while simultaneously drawing the shell snuggly against its carrier plate as a fastener is passed through the clip and into the carrier plate for fastening the shell to its carrier plate.

The fastener clip is substantially U-shaped, and has a first leg and a spaced second leg. Each leg extends in a lengthwise direction away from a body portion of the clip, and each leg is tapered in its lengthwise direction. It is anticipated that the legs will be tapered at an angle of approximately 15°. In addition, each of the legs is beveled along the spaced parallel side edges of the length of the tapered surface.

In a preferred embodiment of the invention, each of the first and second openings defined in the carrier plate and the half shell, respectively, will also have a tapered surface sized complimentarily to the taper of the respective leg of the clip received therein, each such tapered surface also being complimentarily beveled so that the clip progressively aligns the first and second openings with respect to one another, and progressively draws the shell and the carrier plate toward one another as the fastener, preferably an elongate threaded fastener, is passed through the fastener clip and into a threaded opening defined in the carrier plate.

It is anticipated that the half shell can be either a single or dual cavity blow mold shell. Moreover, in addition to the first and second openings defined in the top edges of the carrier plate and half shell, respectively, it is anticipated that additional openings, provided as corresponding pairs of openings, one each in the carrier plate and the half shell, maybe provided along the side edges thereof, as desired, each such pair of openings being provided with one of the fastener clips as described above.

The openings defined in the edges of the carrier plate and half shell are formed as recessed slotted openings, sized and shaped such that as the fastener clip is received in such openings, it fits substantially flush with respect to the outwardly facing surfaces of the fastened half shell and carrier plate.

In a second embodiment, the invention includes a blow mold shell assembly for use with a known type of blow mold machine, the machine having a known type of clam shell style blow mold shell opening and closing mechanism to which the blow mold assembly is mounted. So provided, this embodiment of the invention will include first and second carrier plates adapted to be separately affixed to the blow mold shell opening and closing mechanism. First and second blow mold half shells are also provided for being separately and removably fastened to each respective carrier plate.

A first slotted opening is defined in a top edge of each carrier plate, and a corresponding second slotted opening is defined in the top edge of each half shell. The first and second openings are placed in registry with one another as the respective half shells are placed on their carrier plates, whereupon a fastener clip, as described above, one being provided for each pair of the first and second openings described, is received in each one of the openings of each pair of openings, and is constructed and arranged to align and draw each half shell snuggly against its respective carrier plate as a fastener is passed through the clip and into its respective carrier plate.

It is, therefore, an object of the present invention to provide an improved quick change blow mold shell assembly.

Yet another object of the present invention is to provide an improved quick change blow mold shell assembly which is simple in design and construction, is rugged and durable in use, and is easy to use.

It is to these objects, as well as to the other objects, features, and advantages of the present invention, which will become apparent upon reading the specification, when taken in conjunction with the accompanying drawings, to which this invention is directed.

DETAILED DESCRIPTION OF THE PREFERRED EMBODIMENTS

Figure 1:
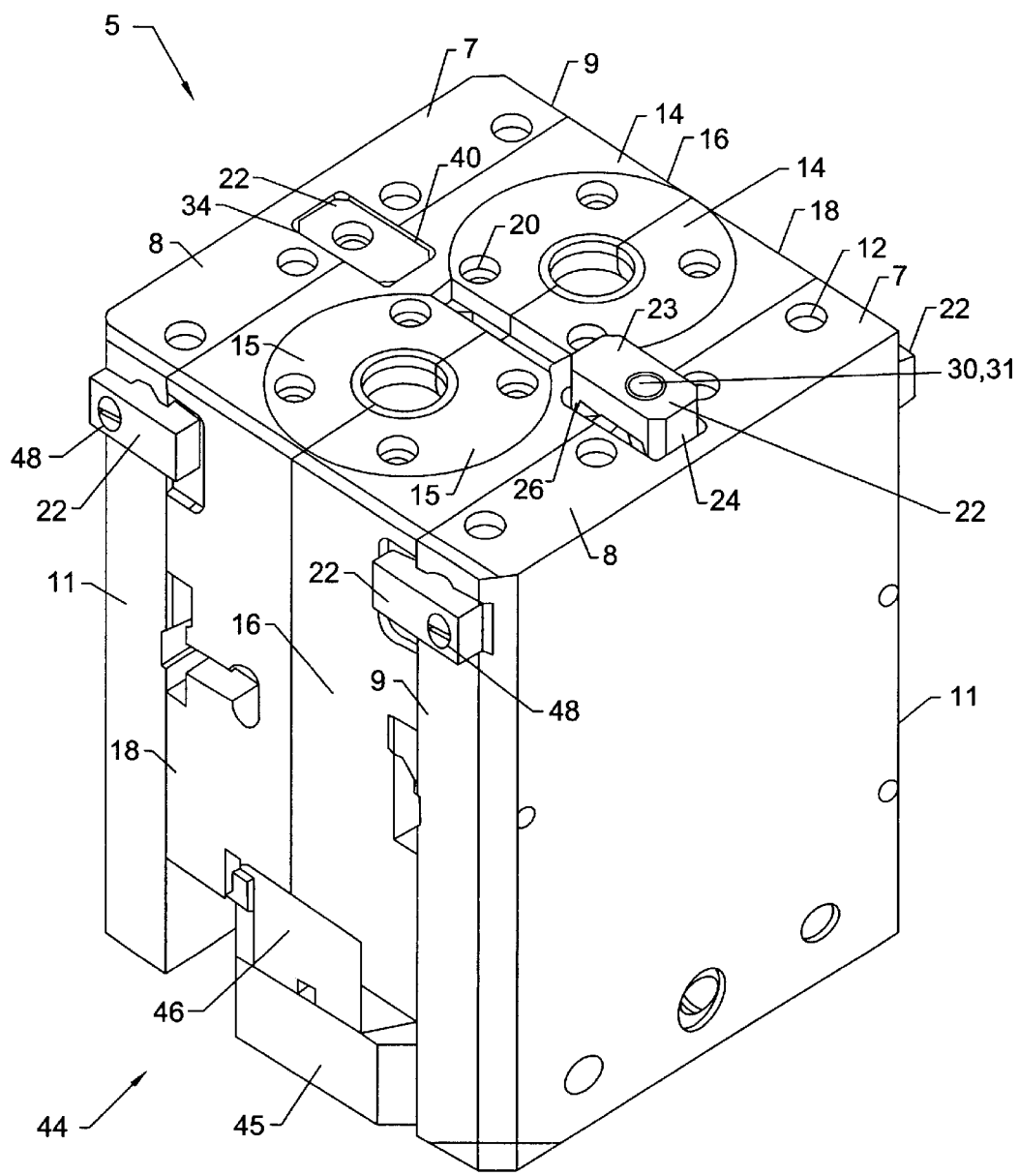
FIG. 1 is perspective illustration of a blow mold shell assembly of the present invention.

The present invention will now be described more fully hereinafter with reference to the accompanying drawings, in which like reference numerals indicate like parts throughout the several views, and in which preferred embodiments are shown. It is understood by those skilled in the art that this invention may be embodied in many different forms, and should not be construed as being limited to the embodiments set forth herein. Rather, the embodiments set forth herein are provided so that the disclosure will be thorough and complete, and which embodiments will fully convey the scope of the invention to those skilled in the art.

Referring now to FIG. 1, a preferred embodiment of blow mold shell assembly 5 is illustrated. The blow mold shell assembly is provided for use on the known types of blow mold machines, and more preferably for use on a rotary type of blow mold machine, as described in U.S. Pat. No. 5,683,729 to Valles entitled, "Apparatus For Making Containers by Blow Molding Plastic Parisons;" and U.S. Pat. No. 5,326,250 to Doudement entitled, "Opening and Closing Mechanism for Portfolio Blowing and Blowing-Stretching Mold," both of which are incorporated herein fully by this reference.

As such, blow mold shell assembly 5 is provided with a pair of carrier plates 7 for being fastened to an opening and closing mechanism of the type illustrated in the '250 patent to Doudement. As the device of Doudement is fully disclosed and described in the '250 patent, it is not illustrated in FIG. 1, nor described in greater detail herein.

Each of carrier plates 7 is substantially identical, and includes a top edge 8, and a pair of spaced parallel side edges 9, 11 extending downwardly away from the top edge. In known fashion, a series of cooling fluid openings 12 are defined in the top edge of the carrier plates and in communication with suitable conduits (not illustrated) so that a cooling fluid, as known, may be circulated through the carrier plate during the blow molding operation for the purposes of heat treating and/or cooling the blow mold shells, and/or the PET parisons during the molding process.

Figure 2:
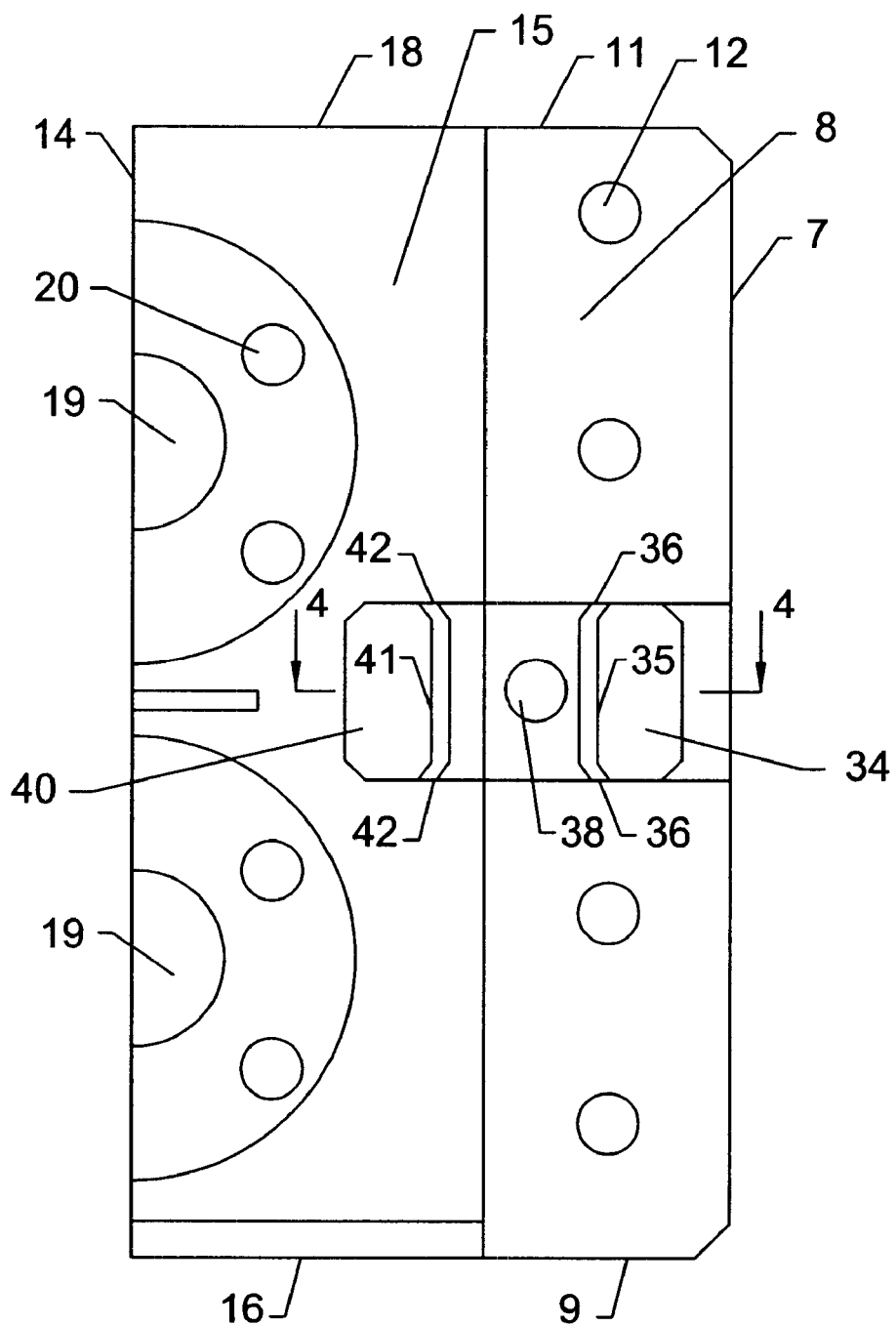
FIG. 2 is a top plan view of a blow mold half shell and its carrier plate prior to having a fastener clip passed into the corresponding slotted openings defined within the top edges thereof.
Figure 3A:
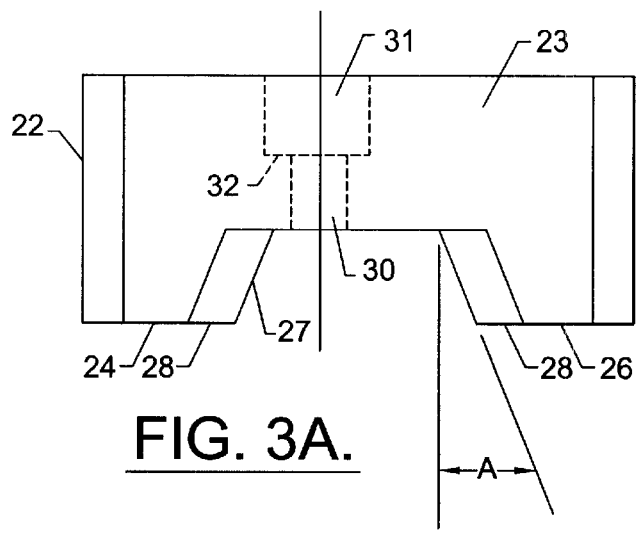
FIG. 3A is a side elevational view of a preferred embodiment of the fastener clip of this invention.
Figure 3B:
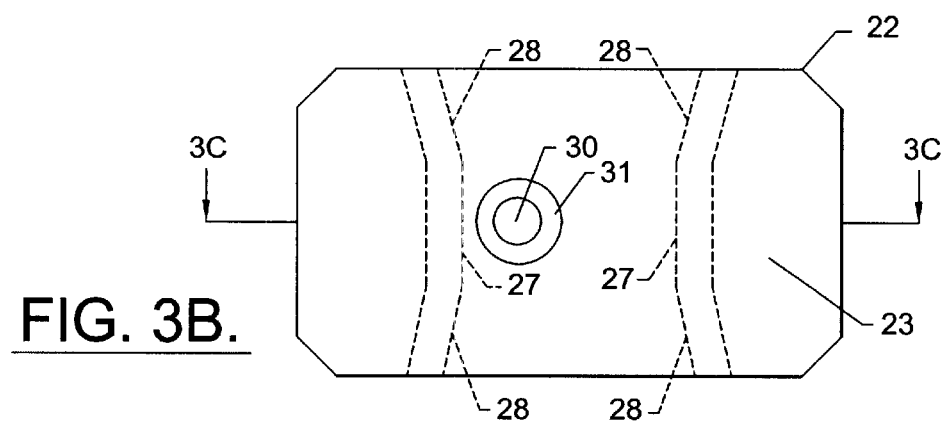
FIG. 3B is a top plan view of the fastener clip of FIG. 3A.
Figure 3C:
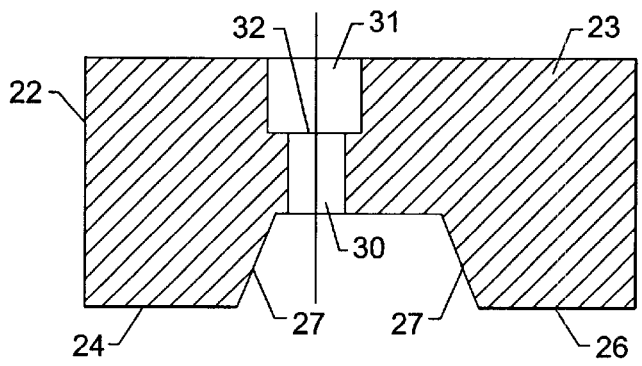
FIG. 3C is a side elevational cross-section view of the fastener clip of FIG. 3B taken along line 3C—3C.

Still referring to FIG. 1, the blow mold shell assembly also includes a pair of substantially identical blow mold half shells 14, each of which has a top edge 15, and pair of spaced parallel side edges 16, 18 extending downwardly away therefrom. As shown in FIGS. 1 and 2, the blow mold half shells 14 illustrated here have dual mold cavities 19 defined therein such that two containers may be blow molded simultaneously, as illustrated schematically and described in the '729 patent to Valles. It is anticipated that the invention may also be used with blow mold shells having only a single molding cavity, or blow mold shells having more than two molding cavities, as desired. In known fashion, a series of neck cooling fluid openings 20 are defined in the top edge of each blow mold half shell and in communication with suitable fluid conduits (not illustrated), such that a cooling or heat treating fluid can be circulated through the neck of the shell during the blow molding process.

As known to those of skill in the art, for example referring to FIG. 1 of the '729 patent to Valles, and the opening and closing mechanism of the '250 to Doudement, rotary blow mold machines provide the advantage of a high throughput such that the improved production efficiency demanded by modern stretch blow mold producers may be satisfied. A drawback with this type of clam shell opening and closing mechanism, however, occurs when it is desired to change the blow mold half shells from a first size, shape, or design, to a second size, shape, and/or design, for example from a dual cavity mold shell to a single cavity mold shell, as there typically is a very limited amount of space which is available for machine service technicians to remove the half shells and replace them with the appropriate half shells. This oftentimes has to be done within a protective enclosure (not illustrated) in which the rotary blow mold machine is housed, compounding the difficulty in changing over the mold shells.

As the carrier plates are fastened to the opening and closing mechanism, by using suitable threaded fasteners (not illustrated), and are not adapted for being readily changed out themselves, what must be adapted for quick changeover, then, is the blow mold half shells. Most blow mold half shells, however, are affixed to their carrier plates by threaded fasteners which are either passed through the carrier plate and into the blow mold half shells, or by straps or other clamps passed across the outside surfaces of the half shell and its carrier plate. Although these provide a generally satisfactory means of affixing the blow mold half shells to their respective carrier plates, the problem still persists in that a limited amount of room is available for placing and removing the threaded fasteners within the carrier plates, half shells, and/or clamps or straps used. Moreover, once the half shells are removed and replaced, the precise re-alignment of the half shell with the carrier plate is necessary in order to align any cooling channels which may be defined in the carrier plate and which feed into or receive the discharge effluent from the half shell, in known fashion. If this precise alignment does not occur, the cooling fluid passed through the carrier plate in the blow mold half shell may leak, resulting in a less than adequate heat treatment of the parison during the blow mold process, or may unduly cool portions of the blow mold half shell which are not to be cooled, resulting in unsatisfactory containers.

With this as background, then, it is seen with reference to FIGS. 1–4 that fastener clip 22 in conjunction with first opening 34 defined in carrier plate 7, and second opening 40 defined in the blow mold half shell 14, provides a much simpler quick change blow mold shell assembly which can be quickly used to produced repeatedly accurate results in mounting blow mold half shells to their carrier plates during mold changeover operations. Fastener clip 22 is provided with a body portion 23 having a first leg 24 and a spaced second leg 26, both of which extend away therefrom in a common direction. As best shown in FIGS. 3A–3C, the first and second legs 24, 26 are parallel to one another, although they both have an inwardly facing tapered surface 27 extending in the lengthwise direction of each such leg, and a pair of beveled surfaces 28 extending along the lengthwise spaced, parallel side edges of the tapered surface. It is anticipated that the tapered surfaces 27 of each leg 24, 26 will have a taper angle, denoted by the reference character "A" in FIG. 3A, of 15°. The taper angle A may be greater or less than 15°, although 15° is preferred in this construction.

The fastener clip 22 also includes a continuous throughbore 30 defined therein such that an elongate threaded fastener 48 (FIG. 1) can be passed therethrough for affixing the fastener clip to one of carrier plates 7. A counterbore 31 is drilled within the outside end of the bore 30, such that a shoulder 32 is defined for seating the head of the fastener 48 thereon as the fastener clip is threadably affixed to its carrier plate 7.

Figure 4:
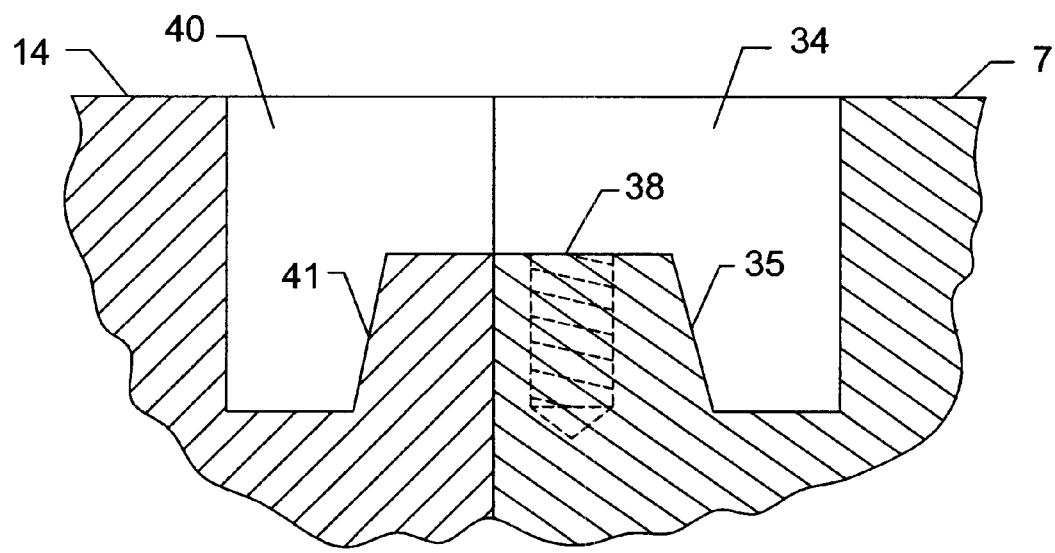
FIG. 4 is a partial cross-sectional side elevational view along line 4—4 of FIG. 2 illustrating the slotted openings defined in the carrier plates and half shells of the invention.

Referring now to FIGS. 2 and 4, a first slotted opening 34 is defined in carrier plate 7, and is best described as being an elongate or slotted opening formed in the top edge 8 of the carrier plate. The slotted opening 34 has a tapered surface 35 which is sized and shaped complimentarily to the tapered surfaces 27 on the legs of the fastener clip 22. In similar fashion, a pair of spaced parallel beveled surfaces 36 are defined along the opposite sides of the tapered surface 35. A fastener opening, preferably a threaded opening, is defined within the first slotted opening 34 and within carrier plate 7 for receiving fastener 48 therein.

A second slotted opening 40 is defined in the top edge 15 of the blow mold half shell 14. In the same fashion as does first opening 34, second opening 40 includes a tapered surface 41 which is the sized complimentarily to the tapered surfaces 27 of the legs 24, 26 of the fastener clip 22, and has a pair of spaced parallel beveled surfaces 42 formed along the opposite sides of tapered surface 41, and extending in the lengthwise direction of the second opening 40.

So constructed, and as best shown in FIG. 1, fastener clip 22 is positioned with its first leg 24 in first slotted opening 34, and a second leg 26 in second slotted opening 40, as an elongate threaded fastener 48 is passed through the bore 30 and received within the threaded opening 38 defined in the carrier plate. As this occurs, the tapered surfaces 27 of the fastener clip are received on the tapered surfaces 35, 41, respectively of the first and second slotted openings 34, 40. The fastener clip is thus threadably affixed to the carrier plate to securely fasten the blow mold half shell to its respective carrier plate. Simultaneously, the beveled surfaces 28 on the first and second legs of the fastener clip are also received on the beveled surfaces 36, 42 of the first and second openings, respectively. The construction of the respective tapered surfaces and beveled surfaces on the legs of the fastener clip, and of the openings in the carrier plate and half shell together act to align the first and second openings with respect to one another to ensure that any cooling ports defined within the blow mold half shell and/or the carrier plate become aligned, and to also draw the blow mold half shell snuggly against its respective carrier plate such that it is held rigidly thereagainst once the fastener clip has been threadably secured to the carrier plate 7.

Although reference is made with respect to the fastening of a fastener clip 22 along the respective top edges 8, 15 of a carrier plate 7 and a blow mold half shell 14, it is understood by those skilled in the art, and as shown in FIG. 1, that a series of first and second openings 34 and 40 may be defined along the side edges 9, 11 of the carrier plates 7, and the side edges 16, 18, of the blow mold half shell 14, respectively, with identical ones of the fastener clips 22 placed therein, such that the blow mold half shell is fixedly secured to its carrier plate along the periphery of both the half shell and the carrier plate.

As shown in FIG. 1, as well as in FIG. 4, the fastener clip 22 may be sized and shaped such that as it is passed into the openings 34, 40 defined within the carrier plate and half shell respectively, it may be received substantially flush therein, or may even be recessed with respect to these edges. Similarly, and as also shown in FIG. 1, if desired, the fastener clip 22 may be received on the abutting edges of the blow mold half shell and its carrier plate, for example on side edge 16 of the blow mold half shell and side edge 9 of its corresponding carrier plate.

Still referring to FIG. 1, the blow mold shell assembly is shown closed about a known type of base assembly 44, provided with a pedestal 45 on which a base 46 or "crown" portion of the blow mold shell assembly is provided. As is known, in operation the opening and closing device of the '250 patent to Doudement will open the blow mold shells for receiving preheated parisons therein and for ejecting the completed; i.e. molded, container. As the opening and closing mechanism begins to close the blow mold half shells on one another for defining, at least partially, the container, the pedestal 45 is simultaneously moved upward such that the base portion 46 of the mold becomes engaged on the bottom surfaces (not illustrated) of the respective half shells, the half shells being constructed and arranged, in known fashion, to be closed about the base portion 46 for defining a substantially closed blow mold.

Although it is not shown in FIG. 1, it is anticipated that the quick change blow mold shell construction described hereinabove with reference to the blow mold half shells 14 and carrier plates 7, may be used with respect to pedestal 45 and base portion 46 for securing the base portion to its pedestal, this making it even easier still to change over blow mold shell assemblies when needed.

It will be appreciated that many modifications and other embodiments of the invention will come to mind to those skilled in the art to which this invention pertains, having the benefit of the teachings presented in the foregoing description and the associated drawings. It is understood, therefore, that the invention is not to be limited to the specific embodiments disclosed herein, and that many modifications and other embodiments of the invention are intended to be included within the scope of the appended claims. For example, although a construction of the fastener clip having a tapered surface and a pair of beveled side edges is disclosed, the bevels may be provided, or may be dispensed with as desired, and the angle of taper may be increased, or decreased, as desired. Also, although specific terms are employed herein, they are used in a generic and descriptive sense only and not for the purposes of limiting the described invention, or the claims which follow.

I claim:

1. A method of assembling a blow mold shell assembly, said assembly characterized by a mold shell having a rear face and a carrier plate having a mounting face, said method comprising:

providing a first opening in an edge of said mounting face of said carrier plate;

providing a second opening in an edge of said rear face of said mold shell such that said second opening will be in registry with said first opening along a mating surface generally defined by said rear face and said mounting face when said mold shell is assembled to said carrier plate;

providing a fastener clip sized and shaped to be received in each of said first and second openings;

providing a fastener configured to pass through said clip and into said carrier plate;

placing said fastener clip within each of said first and second openings;

inserting said fastener in a first direction through said clip and into said carrier plate;

progressively tightening said fastener such that said first and second openings are aligned and such that said rear face of said mold shell is drawn toward said mounting face of said carrier plate in a direction generally perpendicular to said first direction until said mold shell is drawn snugly against said carrier plate.

2. The method of claim 1, wherein said fastener comprises a threaded fastener, said method further comprising:

providing an elongate bore along a fastener axis parallel to said first direction and extending through said clip to receive said fastener;

providing an elongate counterbore along said fastener axis extending partially through said clip to form an annular shoulder within said bore for abutting said fastener;

providing a threaded opening configured to receive said fastener and extending into the bottom of said first opening along said fastener axis.

3. The method of claim 1, further comprising:

providing a first leg on the bottom surface of said clip sized and shaped to be received in said first opening;

tapering said first leg at a first taper angle with respect to said mating surface such that said first leg narrows in said first direction;

providing a second leg on the bottom surface of said clip sized and shaped to be received in said second opening; and tapering said second leg at a second taper angle with respect to said mating surface such that said second leg in said first direction.

4. The method of claim 3, further comprising:

providing a first slot in the bottom of said first opening, said first slot having at least a first bearing wall nearest said mating surface and a first back wall;

tapering said first bearing wall at said first taper angle such that said first slot narrows in said first direction, said first bearing wall sized to compliment said first leg of said clip;

providing a second slot in the bottom of said second opening, said second slot having at least a second bearing wall nearest said mating surface and a second back wall; and tapering said second bearing wall at said second taper angle such that said second slot narrows in said first direction, said second bearing wall sized to compliment said second leg of said clip.

5. The method of claim 4, wherein said step of placing said fastener clip within each of said first and second openings further comprises:

placing said first leg against said first bearing wall; and placing said second leg against said second bearing wall.

6. The method of claim 4, wherein said first leg has at least one generally linear first edge and said second leg has at least one generally linear second edge, said method further comprising:

beveling said first edge in a direction generally perpendicular to said first direction; and beveling said second edge in a direction generally perpendicular to said first direction.

7. The method of claim 6, wherein said first bearing wall has at least one generally linear first bearing edge and said second bearing wall has at least one generally linear second bearing edge, said method further comprising:

beveling said first bearing edge in a direction generally perpendicular to said first direction, such that said first bearing wall is sized and shaped complimentarily to said first leg of said clip; and beveling said second bearing edge in a direction generally perpendicular to said first direction, such that said second bearing wall is sized and shaped complimentarily to said second leg of said clip.

8. The method of claim 7, wherein said step of placing said fastener clip within each of said first and second openings further comprises:

placing said first leg against said first bearing wall; and placing said second leg against said second bearing wall.

9. A method of disassembling a blow mold shell assembly, said assembly characterized by a mold shell having a rear face drawn snugly against a mounting face of a carrier plate, said assembly joined along a mating surface generally defined by said rear face and said mounting face, said method comprising:

providing a first opening in an edge of said mounting face of said carrier plate;

providing a second opening in an edge of said rear face of said mold shell such that said second opening will be in registry with said first opening along said mating surface when said mold shell is assembled to said carrier plate;

providing a fastener clip sized and shaped to be received in each of said first and second openings;

providing a fastener configured to pass through said clip and into said carrier plate in a first direction;

progressively loosening said fastener in a direction generally opposite to said first direction until said mold shell is no longer held snugly against said carrier plate;

separating said mold shell from said carrier plate during said loosening;

removing said mold shell from said carrier plate; and removing said fastener.

10. The method of claim 9, wherein said fastener comprises a threaded fastener, said method further comprising:

providing an elongate bore along a fastener axis parallel to said first direction and extending through said clip to receive said fastener;

providing an elongate counterbore along said fastener axis extending partially through said clip to form an annular shoulder within said bore for abutting said fastener;

providing a threaded opening configured to receive said fastener and extending into the bottom of said first opening along said fastener axis.

11. The method of claim 9, further comprising:

providing a first leg on the bottom surface of said clip sized and shaped to be received in said first opening;

tapering said first leg at a first taper angle with respect to said mating surface such that said first leg narrows in said first direction;

providing a second leg on the bottom surface of said clip sized and shaped to be received in said second opening; and tapering said second leg at a second taper angle with respect to said mating surface such that said second leg in said first direction.

12. The method of claim 11, further comprising:

providing a first slot in the bottom of said first opening, said first slot having at least a first bearing wall nearest said mating surface and a first back wall;

tapering said first bearing wall at said first taper angle such that said first slot narrows in said first direction, said first bearing wall sized to compliment said first leg of said clip;

providing a second slot in the bottom of said second opening, said second slot having at least a second bearing wall nearest said mating surface and a second back wall; and tapering said second bearing wall at said second taper angle such that said second slot narrows in said first direction, said second bearing wall sized to compliment said second leg of said clip.

13. The method of claim 12, wherein said step of separating said mold shell from said carrier plate further comprises:

resting said first leg of said clip against said first bearing wall; and resting said second leg of said clip against said second bearing wall, such that said first and second bearing walls partially retain said clip, thereby supporting said mold shell in its separated condition.

* * * * *